US011215405B2

(12) United States Patent
Kenworthy et al.

(10) Patent No.: US 11,215,405 B2
(45) Date of Patent: *Jan. 4, 2022

(54) HEAT EXCHANGER WITH NON-ORTHOGONAL PERFORATIONS

(71) Applicant: Unison Industries, LLC, Jacksonville, FL (US)

(72) Inventors: Michael Thomas Kenworthy, Beavercreek, OH (US); William Dwight Gerstler, Niskayuna, NY (US); Daniel Jason Erno, Clifton Park, NY (US); Thomas Kupiszewski, Liberty Township, OH (US); Joseph Robert Coleman, Brookville, IN (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,640

(22) Filed: Jul. 23, 2019

(65) Prior Publication Data

US 2019/0346219 A1 Nov. 14, 2019

Related U.S. Application Data

(63) Continuation of application No. 15/081,025, filed on Mar. 25, 2016, now Pat. No. 10,378,835.

(51) Int. Cl.
*F28F 13/00* (2006.01)
*F28D 7/08* (2006.01)
(Continued)

(52) U.S. Cl.
CPC ............ *F28F 13/003* (2013.01); *B64D 13/08* (2013.01); *F28D 7/082* (2013.01); *F28D 7/1607* (2013.01);
(Continued)

(58) Field of Classification Search
CPC .. F28F 13/003; F28F 1/32; F28F 1/325; F28F 1/34; F28D 7/082; F28D 7/1607; F28D 7/1623
See application file for complete search history.

(56) References Cited

U.S. PATENT DOCUMENTS 4,854,380 A 8/1989 Yoshida et al.
5,077,601 A * 12/1991 Hatada .................. H01L 23/467
257/722
(Continued)

FOREIGN PATENT DOCUMENTS

DE 102012217323 A1 3/2014
EP 0777094 A2 6/1997
(Continued)

OTHER PUBLICATIONS

Translation of Japanese Patent Document entitled Translation—JP2005331217A (Year: 2021).*
(Continued)

*Primary Examiner* — Paul Alvare
(74) *Attorney, Agent, or Firm* — Dinsmore & Shohl LLP

(57) ABSTRACT

A heat exchanger can include a cooling air conduit having at least one baffle, as well as a hot air conduit having at least two passes through the cooling air conduit. The heat exchanger can further include at least one perforation extending into the least one baffle. The perforation can have a passage connecting an inlet to an outlet.

17 Claims, 9 Drawing Sheets

(51) Int. Cl.
  F28D 7/16 (2006.01)
  F28F 1/32 (2006.01)
  F28F 13/02 (2006.01)
  B64D 13/08 (2006.01)
  F28F 1/34 (2006.01)
  F28D 21/00 (2006.01)

(52) U.S. Cl.
  CPC .............. F28D 7/1623 (2013.01); F28F 1/32 (2013.01); F28F 1/325 (2013.01); F28F 1/34 (2013.01); F28F 13/02 (2013.01); *F05D 2260/22141* (2013.01); *F28D 2021/0021* (2013.01); *F28D 2021/0026* (2013.01)

(56) References Cited

U.S. PATENT DOCUMENTS

| | | | |
|---|---|---|---|
| 6,378,605 B1 | 4/2002 | Kutscher et al. | |
| 7,013,843 B1 | 3/2006 | Weintraub et al. | |
| 7,687,901 B2* | 3/2010 | Furuta | H01L 23/367 257/712 |
| 8,411,438 B2* | 4/2013 | Kubo | H01L 23/3672 361/699 |
| 8,826,970 B2 | 9/2014 | Shiraichi et al. | |
| 9,441,890 B2* | 9/2016 | Kim | F28F 1/325 |
| 10,077,944 B2* | 9/2018 | Hislop | B22F 12/00 |
| 2005/0045316 A1* | 3/2005 | Oh | F28F 1/32 165/150 |
| 2006/0237178 A1* | 10/2006 | Katoh | F28D 1/0333 165/153 |
| 2011/0024093 A1 | 2/2011 | Shiraichi et al. | |
| 2012/0103583 A1* | 5/2012 | Kim | F28D 1/05391 165/173 |
| 2013/0020047 A1 | 1/2013 | Army, Jr. et al. | |
| 2014/0027098 A1* | 1/2014 | Alahyari | F28F 1/00 165/172 |
| 2016/0054065 A1* | 2/2016 | Nagai | F28F 1/32 165/151 |

FOREIGN PATENT DOCUMENTS

| | | | | |
|---|---|---|---|---|
| EP | 2146173 A1 | | 1/2010 | |
| JP | H02154986 A | | 6/1990 | |
| JP | 2002004952 A | | 1/2002 | |
| JP | 2003279279 A | | 10/2003 | |
| JP | 2005207688 A | | 8/2005 | |
| JP | 2005331217 A | * | 12/2005 | ................ F28F 1/28 |
| JP | 2005331217 A | | 12/2005 | |
| JP | 2008170035 A | | 7/2008 | |
| JP | 2008215670 A | | 9/2008 | |
| WO | 2007122996 A1 | | 11/2007 | |
| WO | 2013157212 A1 | | 10/2013 | |

OTHER PUBLICATIONS

English Translation of Japanese office action for application 2017-049280 dated Feb. 9, 2021 (6 pages).

English Translation of Indian office action for application 201744009525 dated Feb. 16, 2021 (5 pages).

* cited by examiner

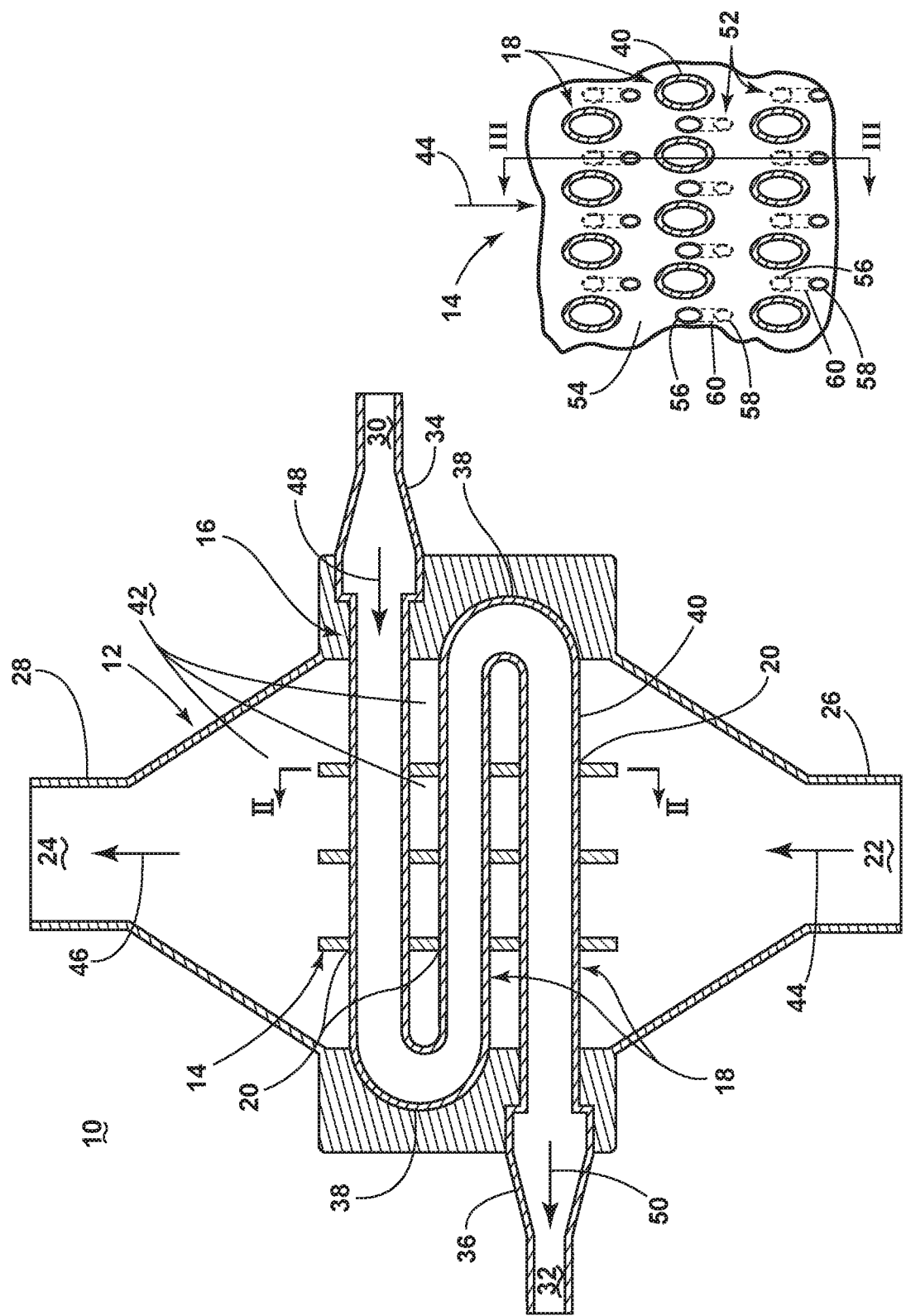

HEAT EXCHANGER WITH NON-ORTHOGONAL PERFORATIONS

CROSS-REFERENCE TO RELATED APPLICATION(S)

This application is a continuation of U.S. patent application Ser. No. 15/081,025, filed Mar. 25, 2016, which is incorporated herein in its entirety.

TECHNICAL FIELD

Aspects of the disclosure relate to a heat exchanger having a cooling fluid conduit, a baffle, and a hot fluid conduit with multiple passes through the baffle.

BACKGROUND

In an aircraft design, a continuous flow of hot air is bled from one part of a gas turbine engine, cooled, and provided to a specific user application. A heat exchanger may be used to cool the hot air.

Heat exchangers in aviation precoolers can utilize interrupted fins such as strip or louver fins having a straight fin geometry with no embellishment. Traditional perforated plate-fin heat exchangers used in other applications are typically stamped constructions, most often with sharp/trapezoidal plate geometries. The cooler matrix is interpenetrated by tubes in some instances. A lesser known method involves the use of perforated fins combined with contracting/expanding passages to control thermal boundary layer growth.

BRIEF DESCRIPTION

In one aspect, the disclosure relates to a heat exchanger including a cooling fluid conduit having at least one baffle, a hot fluid conduit having at least two passes through the cooling fluid conduit, at least one perforation extending into the least one baffle and having a passage connecting an inlet to an outlet, with the inlet and the outlet located on a common side of the at least one baffle, and at least one winglet at least partially defining an outer wall of the passage and extending in a flow-wise direction between the at least two passes.

In another aspect, the disclosure relates to a heat exchanger including a cooling fluid conduit having at least one baffle, a hot fluid conduit having at least two passes through the cooling fluid conduit, at least one perforation extending into the least one baffle and having a passage connecting an inlet to an outlet, with the inlet and the outlet located on a common side of the at least one baffle, and at least one curvilinear cooling fluid flow path passing through the inlet into the at least one baffle, toward a center of the at least one baffle, away from the center of the at least one baffle, and exiting the baffle through the outlet.

BRIEF DESCRIPTION OF THE DRAWINGS

In the drawings:

FIG. 1 is a schematic representation of a heat exchanger in accordance with various aspects described herein.

FIG. 2 is a sectional view through line II-II of FIG. 1.

DETAILED DESCRIPTION

Figure 3:
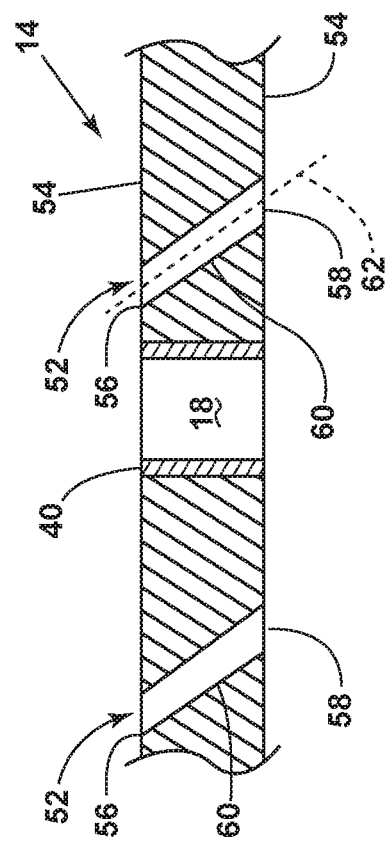
FIG. 3 is a sectional view through line III-III of FIG. 2.

Aspects of the disclosure relate to a heat exchanger and in particular to an improved heat-transfer fin for a heat exchanger. The heat exchanger may be implemented in any environment, including, but not limited to, an aircraft gas turbine engine.

While the term "air" is used throughout the specification in the discussion of the heat exchanger, including in phrases such as, but not limited to, "cooling air" and "hot air," it is understood that various fluids can be supplied to the heat exchanger, including, for example, ambient or atmospheric air, various other gases such as $CO_2$ or mixtures thereof, and various liquids, including water or refrigerants.

FIG. 1 is a schematic representation of a heat exchanger 10 in accordance with various aspects described herein. The heat exchanger 10 includes a first air conduit 12 and a second air conduit 16 between which heat exchange is performed. The first air conduit 12 can be a cooling air conduit 12 having at least one baffle 14 within the conduit 12, and illustrated herein as having multiple, spaced baffles 14, and the second air conduit 16 can be a hot air conduit 16 having multiple passes 18 through the cooling air conduit 12 and forming multiple intersections 20 with the baffles 14. Heat exchange is performed between hot air flowing through the hot air conduit 16 and cooling air flowing through the cooling air conduit 12.

The cooling air conduit 12 can include a cooling air inlet 22 and a cooling air outlet 24. For an aircraft gas turbine engine, the cooling air inlet 22 can receive cooling air from any source having a temperature and pressure that are lower than that flowing through the hot air conduit 16 and the cooling air outlet 24 transports the heated cooling air away from the heat exchanger 10. For example, the cooling air can be sourced from bypass air, FLADE air, or compressor air bleed (such as from a low pressure stage). Headers 26, 28 can define one or both of the inlet and outlet 22, 24, respectively.

The passes 18 can be spaced in a flow-wise direction along the cooling air conduit 12, i.e. in the direction of air flowing from the inlet 22 to the outlet 24. The passes 18 can alternatively be spaced opposite the flow-wise direction. Spacing the passes 18 in the flow-wise direction exposes the coldest cooling air to the air exiting the hot air side of the heat exchanger 10, which usually results in greater effectiveness than if the passes 18 were opposite the flow-wise direction.

The hot air conduit 16 can include a hot air inlet 30 and a hot air outlet 32. For an aircraft gas turbine engine, the hot air inlet 30 typically receives hot air input bled from a portion of the engine core and the hot air outlet 32 transports the cooled bleed air away from the heat exchanger 10. Headers 34, 36 can define one or both of the inlet and outlet 30, 32, respectively. In addition to the multiple passes 18, which are illustrated as being generally linear, the hot air conduit 16 can include multiple returns 38 that connect at least one pass 18 to at least one other pass 18. The returns 38 may be inside or outside the cold volume defined by the cooling air conduit 12, and are illustrated herein as being outside the cold volume in order to maximize the cold volume. Together, the passes 18 and returns 38 can define a serpentine conduit for the hot air conduit 16. The serpentine conduit can wind back and forth through the cooling air conduit 12 multiple times.

It is noted that while only three passes 18 and two returns 38 is shown in FIG. 1, it is understood that the heat exchanger 10 may have additional passes 18 and returns 38. Further, the returns 38 may be defined by one or more return manifolds; one return manifold can define multiple returns 38 for the hot air conduit 16.

The hot air conduit 16 can be provided with one or more tubes 40 defining at least a portion of the hot air conduit 16 passing through the cold volume of the cooling air conduit 12. A single tube 40 can have multiple passes 18 and multiple returns 38, and a single tube 40 or multiple tubes 40 can be provided to form the hot air conduit 16. In the illustrated example, a single tube 40 is shown as forming multiple passes 18 and multiple returns 38 of the hot air conduit 16; however it is to be understood that the heat exchanger 10 can be provided with multiple tubes 40, each having multiple passes 18 and returns 38, that are not visible in the sectional view of FIG. 1. The inlet header 34 can supply hot air to the tubes 40 and the outlet header 36 can collect air discharged from the tubes 40.

The baffles 14 can be formed as thin plates or fins that increase the heat exchange area between the hot air passing through the passes 18 and the cooling air. The baffles 14, as well as the tube 40 forming the passes 18, can be made from materials having heat-conducting ability. The baffles 14 can be disposed generally perpendicularly to the axis of the passes 18, such that the intersections 20 between the baffles 14 and passes 18 generally form right angles.

Within the cooling air conduit 12, the spaces between the baffles 14 and the passes 18 form openings 42 for cooling air supply 44 and cooling air discharge 46, as designed by arrows in FIG. 1, through the cooling air inlet 22 and cooling air outlet 24, respectively. Hot air supply 48 and hot air discharge 50, also designed by arrows, enter and exit the hot air conduit 16 through the hot air inlet 30 and hot air outlet 32, respectively.

The cooling air supply 44 can generally define multiple streamlines of air through the cooling air conduit 12, with the arrow of supply 44 representing one such streamline, and the baffles 14 are generally parallel to each other and parallel to the streamline represented by arrow 44. With the baffles 14 being disposed generally perpendicularly the passes 18, the passes will be perpendicular to the streamline represented by arrow 44.

While the illustrated heat exchanger 10 is shown as being configured so that cooling air is supplied and discharged substantially perpendicularly to hot air, it is understood that other relative orientations between the supply and discharge flows are possible. It is also understood that while both the cooling air and hot air conduits 12, 16 are each shown as having their incoming supply and outgoing discharge flows be substantially parallel to each other through opposing ends of the heat exchanger 10, other configurations are possible, such as the supply and discharge flows being substantially perpendicular to each other, or the supply and discharge flows extending though a common side of the heat exchanger 10, but in opposing directions.

FIG. 2 is a sectional view through line II-II of FIG. 1. As shown in FIG. 2, multiple perforations 52 extend through the baffles 14. The perforations 52 allow the cooling air to flow through the baffles 14, rather than strictly between the baffles 14, which provides improved heat-transfer characteristics to the heat exchanger 10.

The perforations 52 can extend non-orthogonally through the baffles 14, such that the perforations 52 intersect the baffle 14 at a non-right angle. For example, the baffles 14 can define opposing surfaces or sides 54 that are generally parallel to each other, at least in a localized region of the baffle 14 around the perforation 52, and the perforation 52 can extend between the opposing sides 54 at an acute or obtuse angle, depending on the reference point.

The perforations 52 can comprise an inlet 56, an outlet 58, and a passage 60 connecting the inlet 56 to the outlet 58. The outlet 58 is downstream of the inlet 56, such that air enters the perforation 52 through the inlet 56, flows through the passage 60, and exits the perforation 52 through the outlet 58. The inlet 56 and outlet 58 can be formed substantially at the surface 54 of the baffle 14, with the passage 60 extending though the baffle 14 itself. Some examples of the perforation 52 may have the inlet 56 and outlet 58 formed on opposite sides 54 of the baffle 14, while other examples of the perforation 52 have the inlet 56 and outlet 58 on the same side 54 of the baffle 14.

In the illustrated example, the perforations 52 alternate along the direction of cooling air flow 44, such that the inlet 56 of one perforation 52 is formed on the same side 54 of the baffle 14 as the outlet 58 of the downstream perforation 52, and so on. This produces a cyclic flow of air from one side of the baffle 14 to the other. Further, the perforations 52 can be staggered, such that the perforations 52 are aligned with a tube 40 or pass 18, rather than another perforation 52 in the general flow direction of the cooling air supply 44. Here, the perforations 52 are located between streamline-adjacent intersections 20 with the passes 18. This lengthens the distance the cooling air travels and increases heat transfer. The air exiting one perforation 52 along a straight-line path encounters a tube 40, which forces the air to flow around the tube 40.

The perforations 52 can be provided between the tubes 40 defining the passes 18. The tubes 40 may have any cross-sectional shape, and are illustrated herein as being elliptical. Other shapes for the tubes 40 include oval, circular or round. The shape of the tubes 40 can depend on the flow characteristics of the heat exchanger.

The passes 18 can be spaced in a flow-wise direction, i.e. in the general direction of the cooling air supply 44, along the cooling air conduit 12. The passes 18 can further be staggered in a streamline direction along the cooling air conduit 12, such that one pass 18 is not immediately downstream of another pass 18. In an alternate example, the passes 18 can be staggered in a flow-wise direction.

FIG. 3 is a sectional view through line III-III of FIG. 2. The passage 60 defines a centerline 62, which is an axis through the passage 60 from the inlet 56 to the outlet 58 that follows the geometric centers of two-dimensional regions of the passage 60 perpendicular to the general direction of air flow through the passage 60. In some examples of the perforation 52, the centerline 62 can be non-parallel to a local streamline of the cooling air conduit 12, i.e. the streamline at the perforation 52. In this case, the inlet 56 and outlet 58 can be formed on opposite sides 54 of the baffle 14.

The passage 60 may be linear, such that the centerline 62 forms a straight line, or curvilinear, such that the centerline 62 forms a curved line. In the case of a linear passage 60, the inlet 56 and outlet 58 of the passage 60 will be on opposite sides 54 of the baffle 14. In the case of a curvilinear passage 60, the inlet 56 and outlet 58 can be formed on opposite sides or the same side of the baffle 14.

Figure 4:
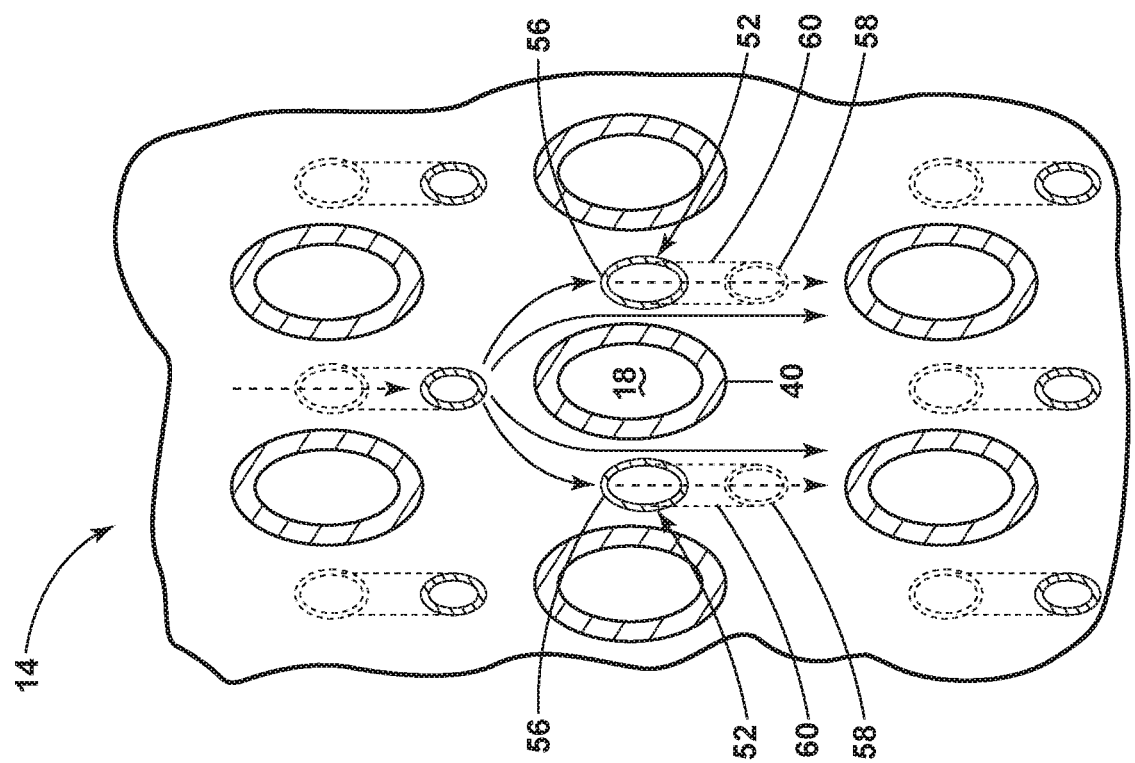
FIG. 4 is a close-up view similar to FIG. 2 showing a portion of the flow path for cooling fluid through the portion of the heat exchanger.

FIG. 4 is a view similar to FIG. 2, showing a portion of the flow path for the cooling air supply 44. Arrows are used in FIG. 4 to generally represent the streamlines of the air flow, and it is understood that the actual air flow in operation may deviate from what is represented. Cooling air flows between and through the baffles 14, with portions of the cooling air traveling internally through the perforations 52 and other portions of the cooling air passing externally over the surface 54. Air entering through the inlet 56 of one perforation 52 travels through the passage 60 and exits the outlet 58 through the opposite side 54 of the baffle 14. The air exiting the outlet 58 encounters a tube 40, which forces the air to flow around the tube 40.

On a system-wide level, air cyclically enters and exits opposite sides of the baffle 14 via the perforations 52, while also traveling between the tubes 40 and between adjacent baffles 14. The non-orthogonal perforations 52 through the otherwise substantially flat baffles 14 produces a breathing effect, with the air expanding and contracting as it passes into and out of the baffles 14. The perforations 52 further have smooth transitions with the baffle surface 54, which minimizes the minor losses associated with each contraction/expansion. The angled perforations 52 improves the cross flow to make sure that the emerging flow from the perforation remains attached as a boundary layer to the opposite surface of the baffles 14. The angled perforations 52 further increase the surface area available for heat exchange, in comparison to a non-angled perforation.

Figure 5:
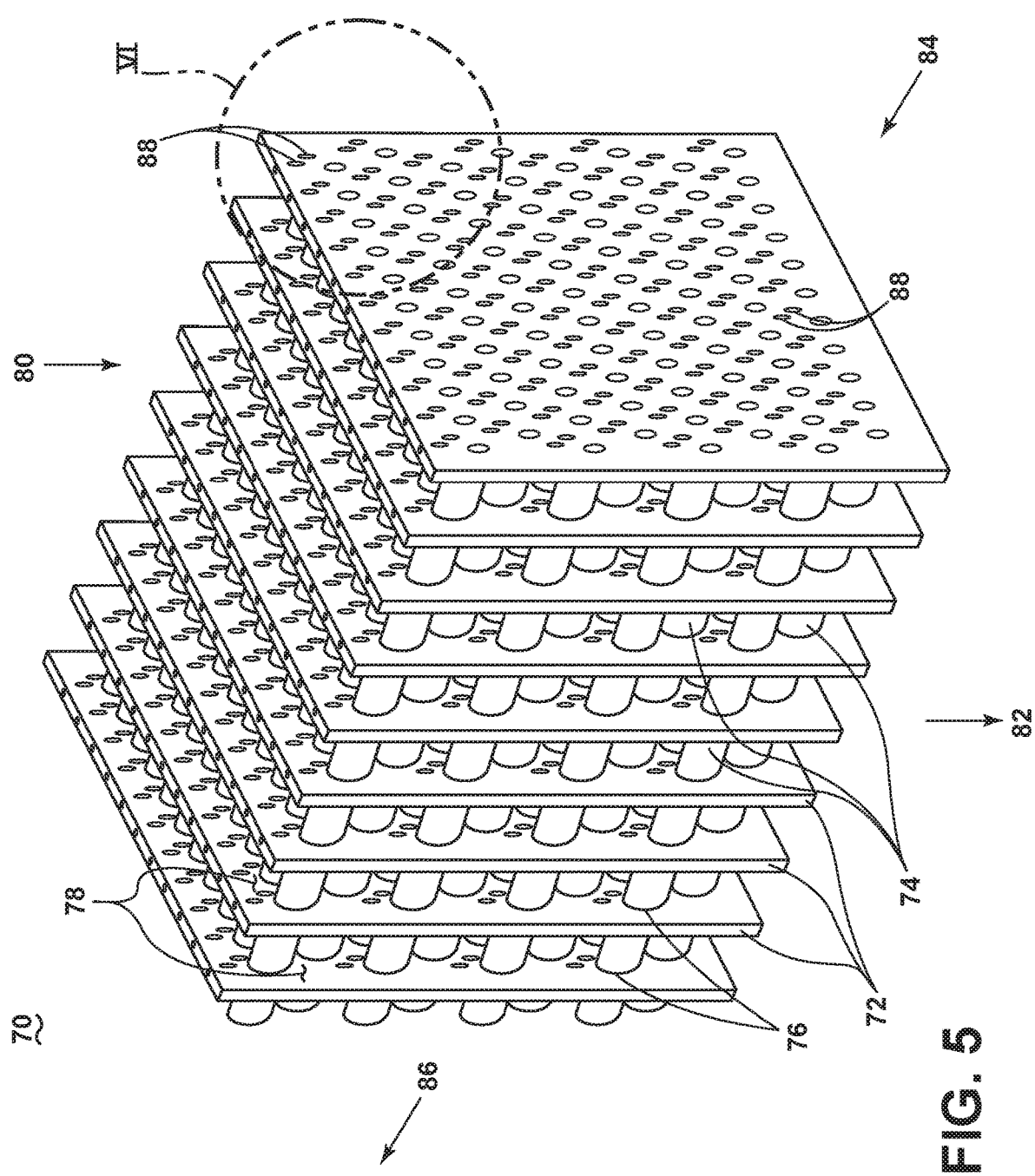
FIG. 5 is a perspective view of a portion of another heat exchanger in accordance with various aspects described herein.

FIG. 5 is a perspective view of a portion of another heat exchanger 70 in accordance with various aspects described herein. The portion of the heat exchanger 70 shown in FIG. 5 may be substantially similar to the heat exchanger shown in FIG. 1, save for the configuration of the perforations. The portion of the heat exchanger 70 illustrated includes multiple spaced baffles 72 within the cooling air conduit and multiple passes 74 of the hot air conduit that forms multiple intersections 76 with the baffles 72. While not shown, the passes 74 can be connected by multiple returns that connect at least one pass 74 to at least one other pass 74, as described for FIG. 1. Further, the returns may be defined by one or more return manifolds; one return manifold can define multiple returns for the passes 74.

The spaces between the baffles 72 and the passes 74 form openings 78 for cooling air supply 80 and cooling air discharge 82, as designed by arrows in FIG. 5. Hot air supply 84 and hot air discharge 86, also designed by arrows, generally enter and exit the portion of the heat exchanger 70 as shown, although the hot air may follow a serpentine path through the passes 74 themselves as described above. Multiple perforations 88 can extend through the baffles 72, and allow the cooling air to flow through the baffles 72, rather than strictly between the baffles 72, which provides improved heat-transfer characteristics to the heat exchanger.

Figure 6:
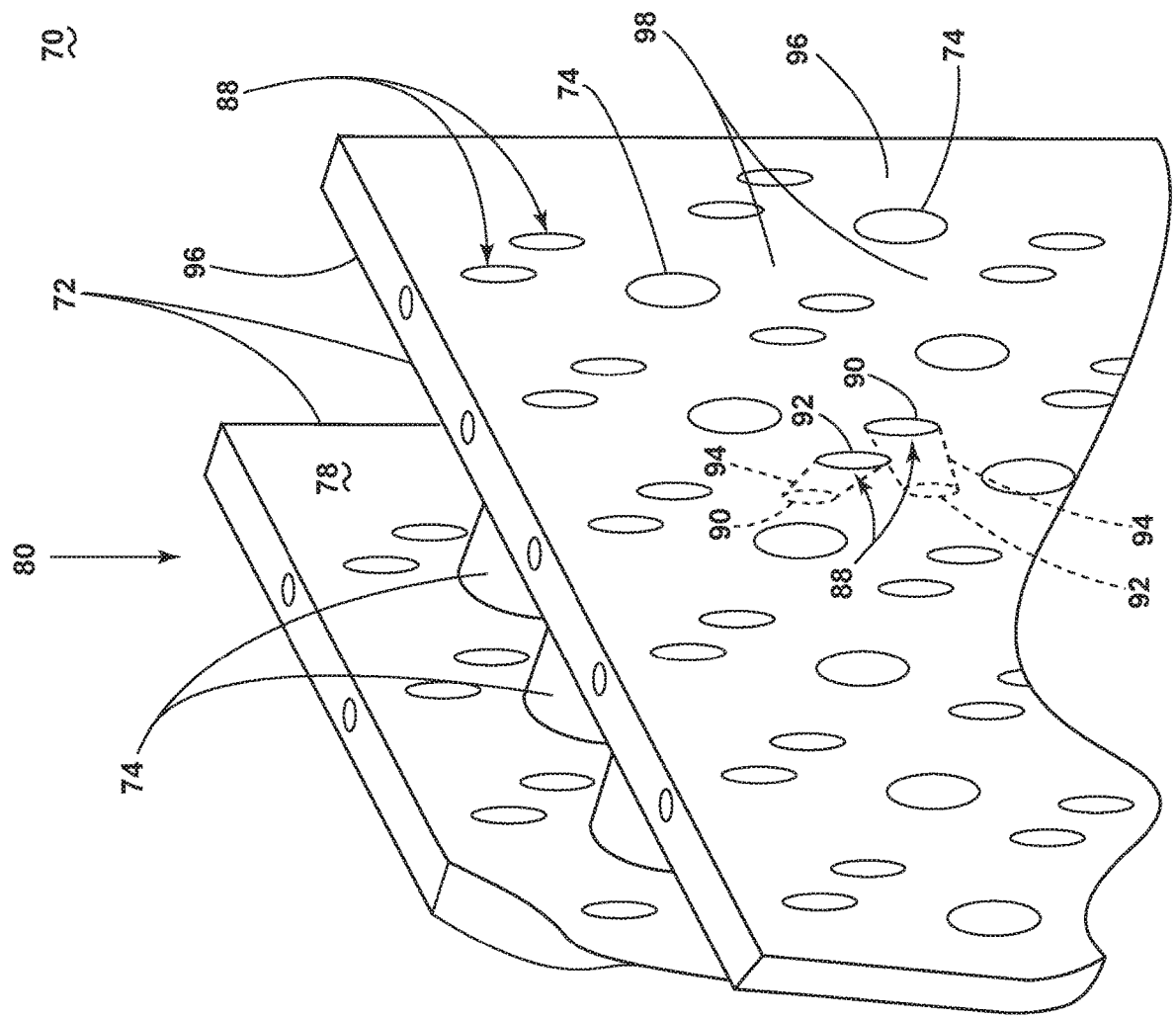
FIG. 6 is a close up view of section VI of FIG. 5.

FIG. 6 is a close up view of section VI of FIG. 5. In the illustrated example, the perforations 88 can extend non-orthogonally through the baffles 72 and can be arranged in pairs between the passes 74. This arrangement of perforations 88 can increase mixing, resulting in improved break-up of the thermal boundary layer that occurs along the baffles 72.

The perforations 88 can comprise an inlet 90 connected to an outlet 92 via a passage (not shown). The inlet 90 and outlets 92 can be formed substantially at one of the opposing surfaces or sides 96 of the baffle 72, with the passage extending though the baffle 72 itself. In the illustrated example, each perforation 88 has its respective inlet 90 and outlet 92 formed on opposite sides 94 of the baffle 72, and the perforations 88 are staggered between the passes 74.

While the baffles 72 are shown as having flat or planar sides 96, the sides 96 can alternatively be provided with a surface contour that will affect the airflow over and between the baffles 72. For example, the areas of the sides 96 between the perforations 88 and passes 74 may be provided with concavities or dimples at sites 98 for trapping the streamlines of air flowing out of the perforations 88 over the baffles 72.

Figure 7:
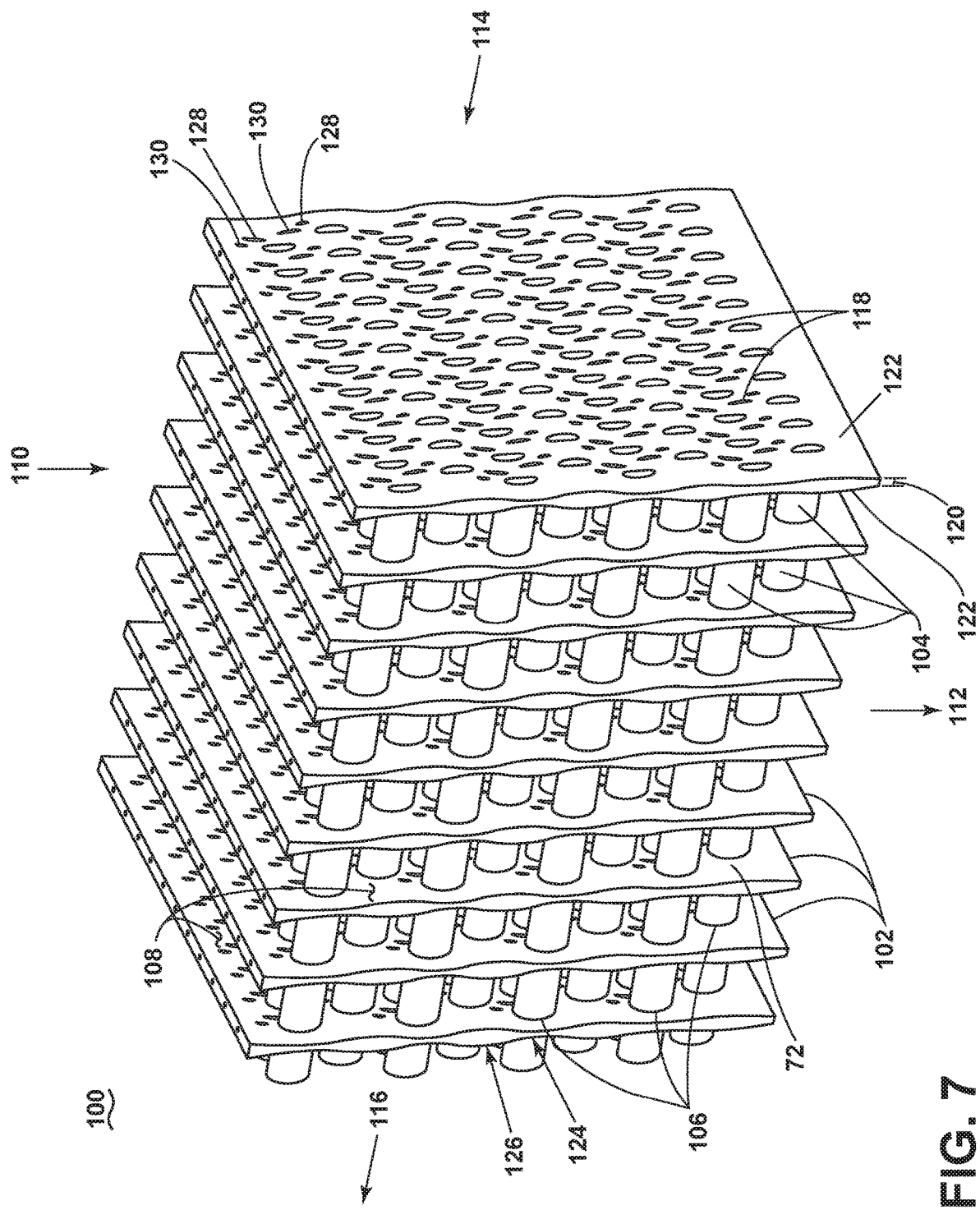
FIG. 7 is a perspective view of a portion of another heat exchanger in accordance with various aspects described herein.

FIG. 7 is a perspective view of a portion of another heat exchanger 100 in accordance with various aspects described herein. The portion of the heat exchanger 100 shown in FIG. 7 may be substantially similar to the portion of the heat exchanger 100 shown in FIG. 5, save for the configuration of the baffles. The portion of the heat exchanger 10 illustrated includes multiple spaced baffles 102 within the cooling air conduit and multiple passes 104 of the hot air conduit that forms multiple intersections 106 with the baffles 102. While not shown, the passes 104 can be connected by multiple returns that connect at least one pass 104 to at least one other pass 104, as described for FIG. 1. Further, the returns may be defined by one or more return manifolds; one return manifold can define multiple returns for the passes 104.

The spaces between the baffles 102 and the passes 104 form openings 108 for cooling air supply 110 and cooling air discharge 112, as designed by arrows in FIG. 7. Hot air supply 114 and hot air discharge 116, also designed by arrows, generally enter and exit the portion of the heat exchanger 100 as shown, although the hot air may follow a serpentine path through the passes 104 themselves as described above. For example, multiple perforations 118 can extend through the baffles 102, and allow the cooling air to flow through the baffles 102, rather than strictly between the baffles 102, which provides improved heat-transfer characteristics to the heat exchanger.

The baffles 102 shown in FIG. 7 are wavy instead of planar when viewed from the side, and accordingly have a modulating thickness 120 such that the thickness 120 of the baffles 102 varies along a flow-wise direction along the cooling air conduit. The thickness 120 of the baffles 102 is defined between opposing surfaces 122 of the baffles 102.

The wavy baffles 102 include concave parts 124 and convex parts 126 which creates a smooth expansion and contraction of the flow channel between the baffles 102. The passes 104 are still generally perpendicular to the baffles 102, but the localized surface 122 of the baffle 102 around a particular pass 104 may be concave or convex, depending on where the pass 104 intersects the baffles 102. For example, the thickness 120 of the baffle 102 may be at its thinnest where a pass 104 intersects the baffle 102. In other examples, the thickness 120 of the baffle 102 may be at its thickest where a pass 104 intersects the baffle 102. This may be the case for all or only some of the intersections 106 between the baffle 102 and passes 104. Due to the waviness of the baffles 102, some perforations 118 may have elongated inlets 128 or outlets 130, but may otherwise be identical to the perforations 88 described for FIGS. 5-6.

Figure 8:
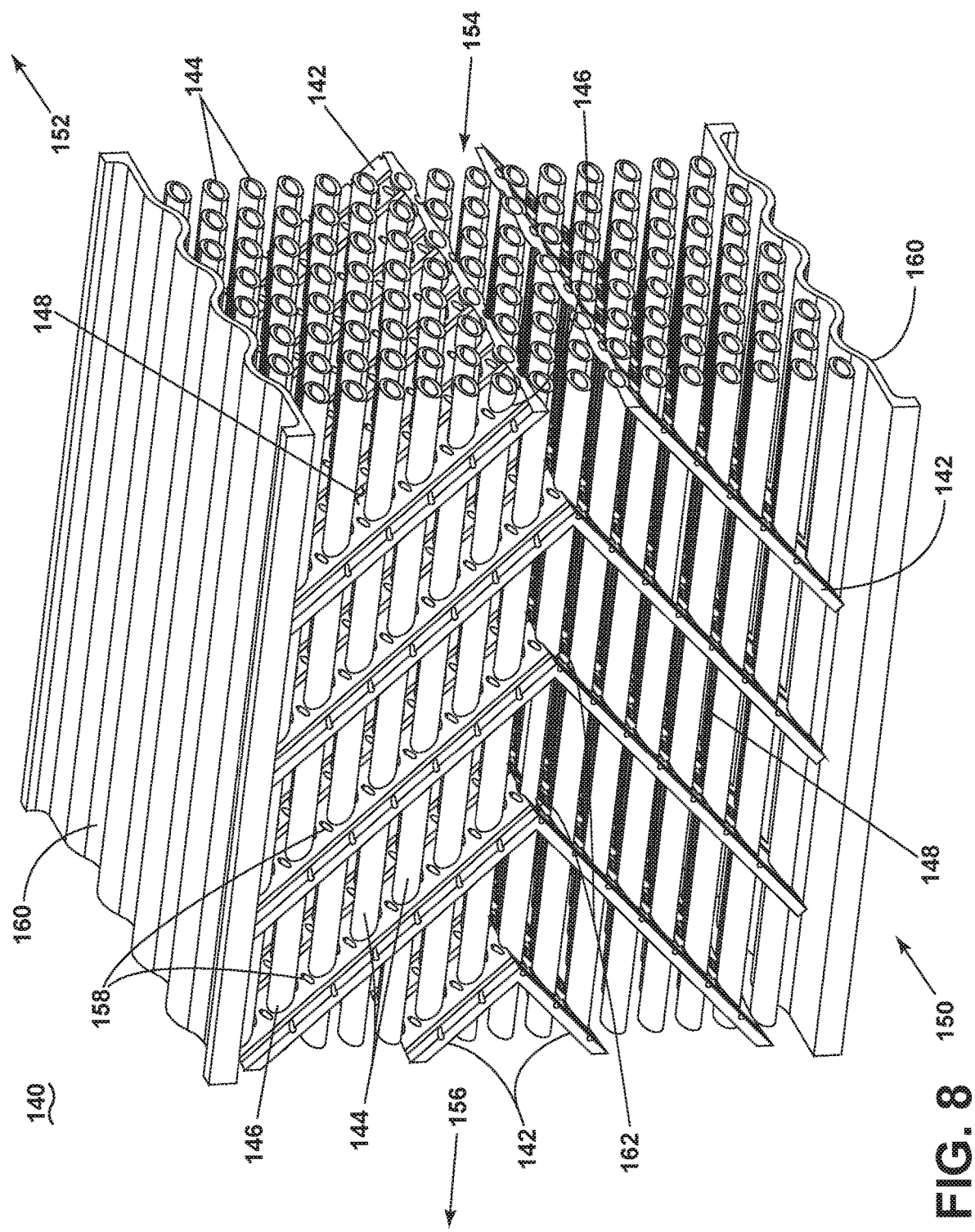
FIG. 8 is a perspective view of a portion of another heat exchanger in accordance with various aspects described herein.

FIG. 8 is a perspective view of a portion of another heat exchanger 140 in accordance with various aspects described herein. The portion of the heat exchanger 140 shown in FIG. 8 may be substantially similar to the heat exchanger shown in FIG. 1, save for the configuration of the baffles. The portion of the heat exchanger 140 illustrated includes multiple spaced baffles 142 within the cooling air conduit and multiple passes 144 of the hot air conduit that forms multiple intersections 146 with the baffles 142. While not shown, the passes 144 can be connected by multiple returns that connect at least one pass 144 to at least one other pass 144, as described for FIG. 1. Further, the returns may be defined by one or more return manifolds; one return manifold can define multiple returns for the passes 144.

The spaces between the baffles 142 and the passes 144 form openings 148 for cooling air supply 150 and cooling air discharge 152, as designed by arrows in FIG. 8. Hot air supply 154 and hot air discharge 156, also designed by arrows, generally enter and exit the portion of the heat exchanger 140 as shown, although the hot air may follow a serpentine path through the passes 144 themselves as described above. For example, multiple perforations 158 can extend through the baffles 142, and allow the cooling air to flow through the baffles 142, rather than strictly between the baffles 142, which provides improved heat-transfer characteristics to the heat exchanger. The perforations 158 can be configured as described above for any of the perforations 52, 88, 118.

In FIG. 8, the passes 144 are non-perpendicular to the baffles 142. The baffles 142 shown in FIG. 8 can be angled to form a chevron configuration and are provided between corrugated shells 160. Each baffle 142 extends at an angle from one of the shells 160 to join another baffle 142 extending from the other shell 160 at a vertex 162. The chevron configuration increases the total surface area per unit volume of the baffles 142, which provides improved heat-transfer characteristics to the heat exchanger.

Figure 9:
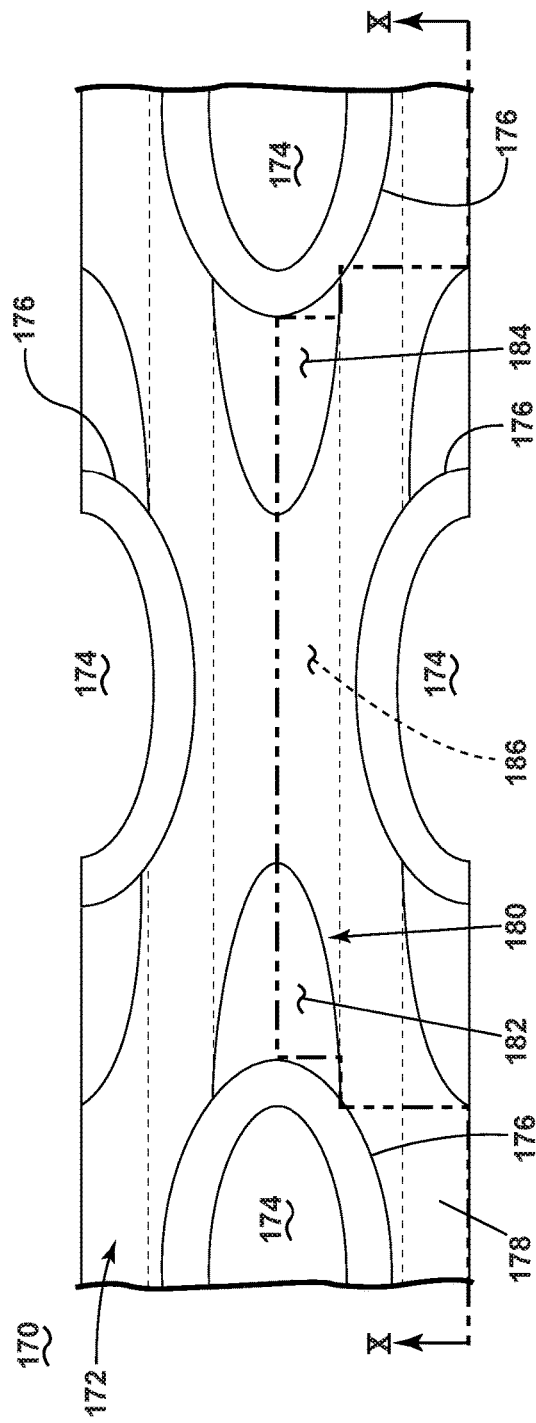
FIG. 9 is a schematic view of a portion of another heat exchanger in accordance with various aspects described herein.
Figure 10:
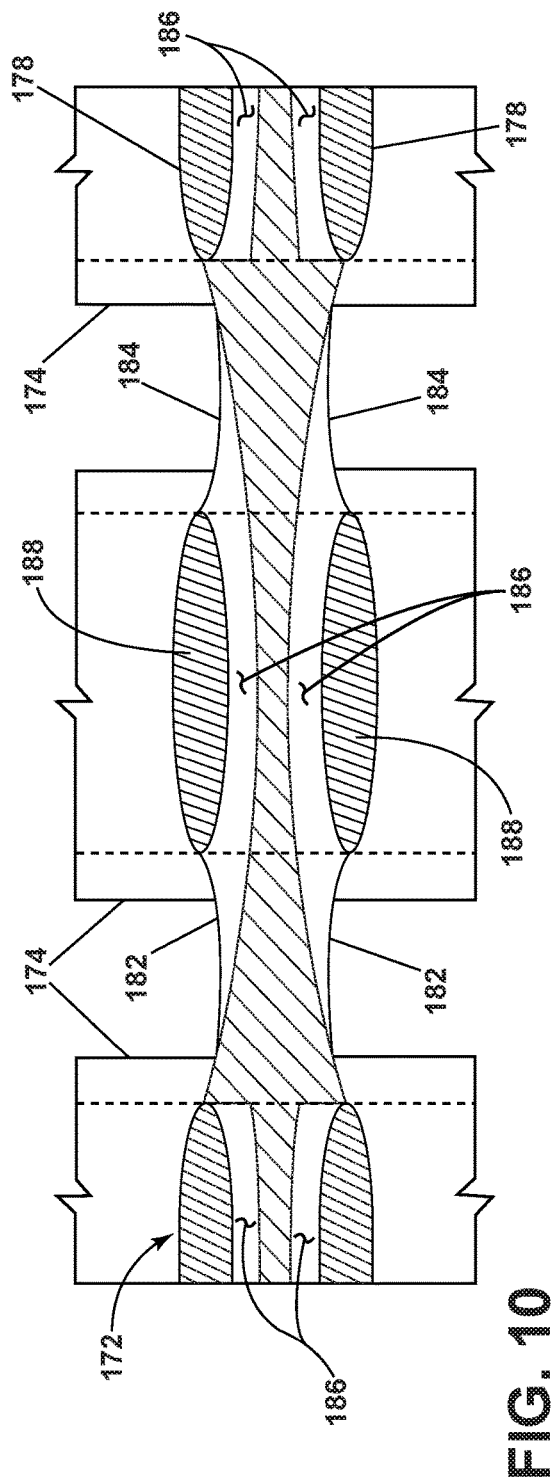
FIG. 10 is a sectional view taken through line X-X of FIG. 9.

FIG. 9 is a schematic view of a portion of another heat exchanger 170 in accordance with various aspects described herein, and FIG. 10 is a sectional view taken through line X-X of FIG. 9. The portion of the heat exchanger 170 shown in FIG. 8 may be used with the heat exchanger shown in FIG. 1. In FIGS. 9-10, one baffle 172 is shown, and multiple passes 174 form multiple intersections 176 with the baffle 172 at the opposing surfaces or sides 178 of the baffle 172. The passes 174 are formed as elliptical tubes. While not shown, the passes 174 can be connected by multiple returns that connect at least one pass 174 to at least one other pass 174, as described for FIG. 1. Further, the returns may be defined by one or more return manifolds; one return manifold can define multiple returns for the passes 174.

Multiple perforations 180 extend through the baffle 172, and can comprise an inlet 182, an outlet 184, and a passage 186 connecting the inlet 182 to the outlet 184. In the illustrated example, the inlet 182 and outlet 184 of one perforation 180 are on the same side 178 of the baffle 172. Further, the inlets 182 are provided immediately downstream of the passes 174 and the outlets 184 are provided immediately upstream of the passes 174.

Perforations 180 are provided on both sides 178 of the baffle 172, such that each side 178 includes multiple perforations, each with its inlet 182 and outlet 184 being provided on a common side 178 of the baffle 172. The perforations 180 are defined by winglets 188 formed in the baffles 172, which intersect the passes 174. The illustrated winglets 188 are elliptical, and are formed in pairs, such that the baffle 172 includes one winglet pair for each pass 174 that the baffle 172 intersects. Each winglet 188 of a winglet pair is associated with a different side 178 of the baffle 172, such that a pair of perforations 180 are provided on both sides 178 of the baffle 172 for each winglet pair. The winglets 188 define a portion of the passages 186, such that the passage 186 extends "underneath" the winglet 188, or toward the center of the baffle 172, before extending outwardly again toward the outlet 184.

As best seen in FIG. 10, the baffle 172 includes a periodic thickness variation that increases the volumetric modulation of the external flow space. The winglets 188 span the inter-tube flow space of the passes 174 to establish the passages 186 for the perforations.

Figure 11:
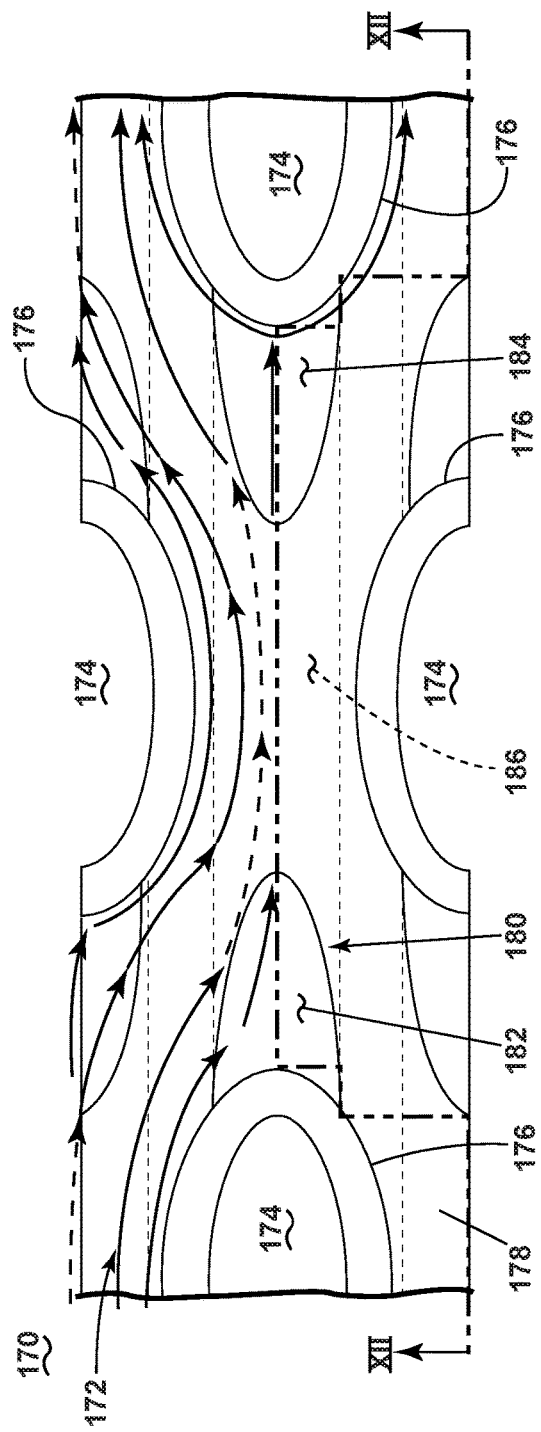
FIG. 11 is a schematic view like FIG. 9, showing a portion of the flow path for cooling fluid through the portion of the heat exchanger.
Figure 12:
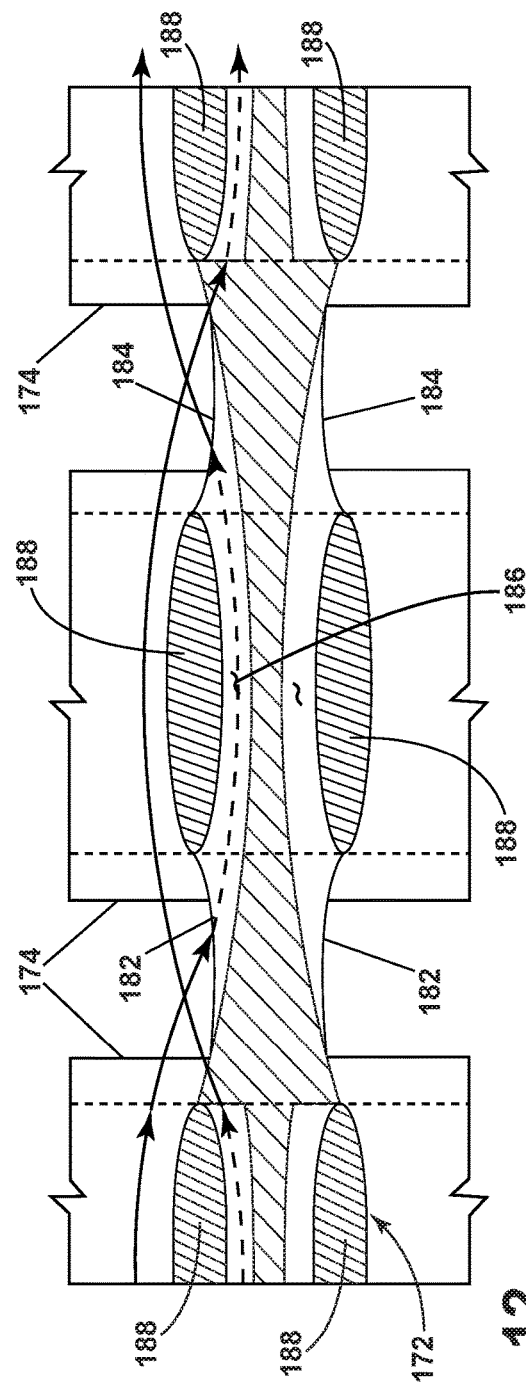
FIG. 12 is a sectional view like FIG. 11 showing a portion of the flow path for cooling fluid through the portion of the heat exchanger.

FIGS. 11-12 are views like FIGS. 9-10 showing a portion of the flow path for cooling air through the portion of the heat exchanger 170. Arrows are used in FIGS. 11-12 to generally represent the streamlines of the air flow, and it is understood that the actual air flow in operation may deviate from what is represented. Cooling fluid, such as cooling air, flows between and through the baffles 172, with portions of the cooling air traveling internally through the perforations 180 and other portions of the cooling air passing externally over the surface 178. Air entering one perforation 180 passes under the winglet 188 defining the passage 186. Air exiting the perforation 180 through the outlet 184 encounters a pass 174 of the hot air conduit, which forces the air to flow around the pass 174, or over another winglet 188.

Aspects of the heat exchangers disclosed herein can be produced by additive manufacturing or 3D printing construction; the three-dimensional geometry of the disclosed perforated baffles and passes in particular may lend itself to additive manufacturing. These processes have the advantage of being able to produce the complex geometries disclosed herein without requiring a secondary joining process. Alternatively, the heat exchanger can be produced using stamping in combination with brazing or another joining process, but is not as preferred as additive manufacturing or 3D printing since highly complex stamping dies would be required. Manufacturing via 3D printing can also eliminate the complexity involved with controlling the geometry of the baffles and tubes while brazing, as well as the reliability issues due to fatigue or quality issues with the braze joints.

Aspects disclosed herein provide a heat exchanger with perforated baffles to improve heat transfer of the heat exchanger. One advantage that may be realized in the above described aspects is that the above described aspects provide an improved baffle perforation. Previously, heat exchanger baffles have employed sloped, trapezoidal shoulders to produce the breathing effect. The trapezoidal transitions between the expanded and contracted portions of the flow channel have pressure losses associated with each of these contracted "throats." With the described aspects of the present disclosure, the transitions between the expanded and contracted portions of the flow channel are made smoothly by the non-orthogonal perforations, which reduces pressure loss and further increases the improvement in heat transfer.

The perforated baffles and passes of the heat exchanger can be produced by additive manufacturing or 3D printing construction. Rather than sloped, trapezoidal shoulders used previously, a far more aerodynamically smooth transition can be employed which will reduce the associated minor loss coefficient significantly. Additionally, with an additive manufacturing process, the pattern can be tessellated for nearly arbitrary conformal geometries, not just bricks or simple curves.

To the extent not already described, the different features and structures of the various aspects may be used in combination with each other as desired. That one feature may not be illustrated in all aspects is not meant to be construed that it may not be, but is done for brevity of description. Thus, the various features of the different aspects may be mixed and matched as desired to form new aspects, whether or not the new aspects are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger, comprising:
   a cooling fluid conduit having a plurality of baffles, each baffle having a first side and a second side opposite the first side;
   a hot fluid conduit having at least two passes through the cooling fluid conduit, at least a portion of the hot fluid conduit extending from the first side of a first baffle of the plurality of baffles to the second side of a second baffle of the plurality of baffles;
   a plurality of perforations extending into the first baffle and having a passage connecting an inlet to an outlet, with the inlet and the outlet located on a common side of the first baffle; and
   at least one winglet at least partially defining an outer wall of the passage and extending in a flow-wise direction between the at least two passes,
   wherein the plurality of perforations includes a first perforation formed on the first side of the first baffle and a second perforation formed on the second side of the first baffle.

2. The heat exchanger of claim 1 wherein the at least one winglet further comprises a pair of winglets formed on the first side and the second side of the first baffle, with each winglet in the pair of winglets defining a portion of the passage for each perforation in the plurality of perforations.

3. The heat exchanger of claim 1 wherein the inlet is immediately downstream of one pass in the at least two passes, and the outlet is immediately upstream of the one pass.

4. The heat exchanger of claim 1 wherein the at least two passes are spaced in a flow-wise direction along the cooling fluid conduit.

5. The heat exchanger of claim 4 wherein the at least two passes form corresponding at least two intersections with the first baffle.

6. The heat exchanger of claim 5 wherein at least one perforation of the plurality of perforations is located between streamline-adjacent at least two intersections.

7. The heat exchanger of claim 5 wherein the first baffle comprises a modulating thickness, and wherein the modulating thickness is thinnest or thickest at the at least two intersections.

8. The heat exchanger of claim 1 wherein the at least two passes are staggered in a streamline direction along the cooling fluid conduit.

9. The heat exchanger of claim 1 wherein the at least two passes are perpendicular to the first baffle.

10. The heat exchanger of claim 1 wherein the hot fluid conduit comprises a serpentine conduit having the at least two passes connected by returns.

11. The heat exchanger of claim 1 wherein the at least two passes form corresponding multiple intersections with the plurality of baffles.

12. A heat exchanger, comprising:
    a cooling fluid conduit having a plurality of baffles, each baffle having a first side and a second side opposite the first side;
    a hot fluid conduit having at least two passes through the cooling fluid conduit, at least a portion of the hot fluid conduit extending from the first side of a first baffle of the plurality of baffles to the second side of a second baffle of the plurality of baffles; and
    a plurality of perforations extending into the first baffle and having a passage connecting an inlet to an outlet, with the inlet and the outlet located on a common side of the first baffle,
    wherein a first perforation of the plurality of perforations defines a first curvilinear cooling fluid flow path formed on the first side of the first baffle, the first curvilinear cooling fluid flow path extending from an inlet of the first perforation into the first baffle, toward a center of the first baffle, away from the center of the first baffle, and terminating at an outlet of the first perforation,
    wherein a second perforation of the plurality of perforations defines a second curvilinear cooling fluid flow path formed on an opposite second side of the first baffle, the second curvilinear cooling fluid flow path extending from an inlet of the second perforation into the first baffle, toward a center of the first baffle, away from the center of the first baffle, and terminating at an outlet of the second perforation.

13. The heat exchanger of claim 12, further comprising a winglet at least partially forming the passage.

14. The heat exchanger of claim 13 wherein the first curvilinear cooling fluid flow path passes beneath the winglet between the inlet and the outlet of the first perforation.

15. The heat exchanger of claim 12, further comprising a pair of winglets on opposite sides of the first baffle and at least partially forming the first curvilinear cooling fluid flow path and the second curvilinear cooling fluid flow path.

16. The heat exchanger of claim 12 wherein the inlet is immediately downstream of one pass in the at least two passes, and the outlet is immediately upstream of the one pass.

17. The heat exchanger of claim 12 wherein the first baffle comprises a modulating thickness that is thinnest or thickest at an intersection between a pass in the at least two passes and the first baffle.

* * * * *